United States Patent
Falcon et al.

(10) Patent No.: US 6,905,664 B2
(45) Date of Patent: Jun. 14, 2005

(54) METHOD FOR REMOVAL OF PCDD AND PCDF FROM COMBUSTION GASES

(75) Inventors: John Antho Falcon, Milan (IT); Giuliano Porcari, Milan (IT)

(73) Assignee: PF Eurocom Ltd., London (GB)

( * ) Notice: Subject to any disclaimer, the term of this patent is extended or adjusted under 35 U.S.C. 154(b) by 277 days.

(21) Appl. No.: 10/271,742

(22) Filed: Oct. 17, 2002

(65) Prior Publication Data

US 2003/0077214 A1 Apr. 24, 2003

(30) Foreign Application Priority Data

Oct. 20, 2001 (EP) .......................................... 01125013

(51) Int. Cl.⁷ ................................................ A62D 3/00
(52) U.S. Cl. .................................. 423/240 S; 588/406
(58) Field of Search ....................... 423/240 R, 240 S, 423/245.1, 245.2, 245.3; 588/207, 206, 205, 209, 248, 406

(56) References Cited

U.S. PATENT DOCUMENTS

| | | | |
|---|---|---|---|
| 4,620,492 A | | 11/1986 | Vogg et al. |
| 5,456,891 A | * | 10/1995 | Fattinger et al. ............. 423/210 |
| 5,951,852 A | * | 9/1999 | Fookes ..................... 208/262.1 |
| 6,323,385 B1 | * | 11/2001 | Iwasaki et al. ............. 588/209 |

FOREIGN PATENT DOCUMENTS

WO   WO 9933525 A1 *   7/1999   ............ A62D/3/00

* cited by examiner

*Primary Examiner*—Edward M. Johnson
(74) *Attorney, Agent, or Firm*—Dickstein Shapiro Morin & Oshinsky LLP (57) ABSTRACT

A method for the removal of micro-pollutants, in particular PCDD and PCDF, from the combustion gases resulting from the incineration of chlorinated organic wastes (ICG), the gases containing acidic products and traces of metals and being treated with catalytically active reactants. The treatment reactants ($R_1 \ldots R_i$) are obtained from the gases during treatment and are fed back to the catalytic treatment unit of the untreated gases under conditions such that the treatment reactants act as effective pollutant removal agents.

11 Claims, 4 Drawing Sheets

METHOD FOR REMOVAL OF PCDD AND PCDF FROM COMBUSTION GASES

1) BACKGROUND OF THE INVENTION

The present invention relates to a method for the removal of micro-pollutants, in particular PCDD and PCDF, from the combustion gases resulting from the incineration of chlorinated organic wastes, said gases containing acidic products and traces of metals and being treated with catalytically active reactants. The invention comprises the apparatus to embody said method.

2) DESCRIPTION OF THE PRIOR ART

The increasing employment of synthetic chlorinated materials such as solvents, elastomers and plastics has occurred in parallel with a growing realisation of the dangers to the environment of the improper disposal of the by-products and waste materials deriving from their manufacture and utilisation. This has resulted in a progressive reduction in the possibilities of using landfills as a disposal method and a consequent necessity to resort to alternative methods, of which incineration is one of major importance. At the same time governments have continued to reduce the permissible concentrations of pollutants, both macro and micro, that incineration operations may leave in their atmospheric and aqueous discharges to the environment. One of the most challenging and costly problems that incinerator designers and operators must face is the adequate removal of the PCDD (poly-chlorinated dibenzodioxine) and PCDF (poly-chlorinated dibenzofuran) micro-pollutants both from their atmospheric and from their aqueous effluents.

Various approaches have been adopted in the past to counter this problem, in general each one being chosen for its compatibility with the rest of the incineration and combustion gas treatment process under consideration. A first approach is to attempt to eliminate the formation of the PCDD and PCDF micro-pollutants by optimising the conditions of the combustion section of the incineration process itself in order to ensure as complete combustion as possible. However, this approach alone is usually not sufficient because the PCDD and PCDF micro-pollutants can be re-formed as the combustion gases from the incineration of chlorinated organic wastes are cooled, for example in their passage through a waste heat boiler, especially if copper is present, for example from catalyst residues present in the waste.

Where the combustion gas treatment system includes a fabric filter, a second approach may be used, in which activated carbon is mixed with the filter pre-coat medium (for example slaked lime or sodium bicarbonate) as an adsorbent for micro-pollutants present either in the gas phase (VOC, volatile organic carbon compounds) or as finely dispersed particulate matter. This approach removes the micro-pollutants from the combustion gases, including the PCDD/PCDF micro-pollutants, and transfers them to the filter dust. The disadvantages of this approach are the costs both of the activated carbon itself and also of the disposal of the dust contaminated with the micro-pollutants.

A third method of eliminating the micro-pollutants is to install a catalytic final treatment unit downstream of the rest of the combustion gas scrubbing system. Such final treatment units are of two different types; the first type is catalytic oxidation in which the micro-pollutants, including the PCDD/PCDF micro-pollutants, are decomposed into carbon dioxide ($CO_2$), water vapour ($H_2O$) and halogen acid gases (HCl etc.) under the combined action of the oxygen ($O_2$) present in the gases and a suitable metallic solid-phase catalyst, typically containing vanadium as the active metal. The major disadvantage of this type of catalyst is that, in addition to oxidising the micro-pollutants, the catalyst also oxidises the colourless nitric oxide (NO) present in the combustion gases into the intensely orange-coloured nitrogen dioxide ($NO_2$). This presents an aesthetic problem whose elimination requires the (catalytic) reduction of the nitric oxide to nitrogen ($N_2$). This may be effected by means of the same catalyst but requires also the injection of ammonia or some other source of reduced nitrogen such as urea. The second type of catalytic final treatment unit is based on the use of a ceramic catalyst which decomposes the micro-pollutants, including the PCDD/PCDF micro-pollutants, into carbon monoxide (CO), water vapour ($H_2O$) and halogen acid gases (HCl etc.) through a mechanism based mainly on cracking which does not appreciably oxidise the nitric oxide (NO). While such processes may cost less in investment and operating costs than the oxidative processes, they nevertheless still represent a significant additional cost to the overall combustion gas treatment system.

The catalytic processes operate in a temperature range above those of the operation of wet scrubbing systems and in some examples also above those of fabric filters, making it necessary to include a heat exchanger and auxiliary burner in the process scheme with a consequent increase in investment and operating costs. In other examples, the catalytic processes are very sensitive to the presence of dust in the gas to be treated, rendering obligatory the installation of a filter upstream.

3) SUMMARY OF THE INVENTION

An objective of the present invention is to provide a method for the removal of micro-pollutants like PCDD/PCDF from the combustion gases from chlorinated organic waste incineration, which eliminates the drawbacks of the prior art, in particular the above mentioned disadvantages.

Another objective of the invention is to provide an apparatus for the embodiment of the said method, which is effective, simple and inexpensive (both in the structure and in the operation) and substantially comprises conventional equipment.

Other objectives will appear from the description hereunder.

The method according to the invention is characterised in that the raw incineration combustion gases are here treated with reactants obtained from the gases themselves, and which are recirculated to the treatment unit under conditions such that they act as effective pollutant removal agents.

The apparatus for the embodiment of the method according to the invention consists substantially of conventional equipment that is used for the removal of major pollutants and is thus advantageously of low additional cost and easy to operate.

It has been discovered that an acidic solution of the salts of certain catalytically active metals can be used to effect a very substantial removal of the PCDD and PCDF micro-pollutants from the combustion gas phase. This leads to the possibility of combining the method and apparatus for PCDD and PCDF micro-pollutant elimination with those of a conventional combustion gas wet quenching stage and/or with those of a conventional hydrochloric acid gas absorption stage, thereby reducing both the investment and the operating costs for the removal of the PCDD and PCDF micro-pollutants.

According to a first feature of the invention, the treatment reactants acting as pollutant removal agents consist of an acidic liquid medium containing a solution of at least one catalytically active metal, in which the removed PCDD and PCDF micro-pollutants may be submitted to concentration.

Advantageously: (i) the acidic liquid medium used is an aqueous solution of the same hydrochloric acid gas that is formed during the combustion of the chlorinated organic waste itself, which must in any case be removed from said combustion gases before they can be discharged into the atmosphere; (ii) the catalytically active metal salt used is that salt which is formed when a catalytically active metal present in the chlorinated organic waste is liberated therein as a pollutant during incineration and is absorbed in the above mentioned acidic medium.

In one preferred embodiment of the invention, the acidic solution of the catalytically active metal salt is utilised as the recirculating liquid in a quenching stage which is located in the process train downstream of the combustion and heat recovery sections as the first step in the combustion gas treatment section in an incineration process for chlorinated organic wastes.

The method according to the invention offers the further advantages that: x) in a wet absorption process for the removal of hydrochloric acid from the combustion gases, use can be made precisely of same hydrochloric acid for the preparation of the acidic solution of a salt of one or more catalytically active metals that is required in the method of the present invention; y) in said wet absorption process the function of removing metals from the incineration combustion gases can be combined with that of preparing the acidic solution of the catalytically active metal salt required by the method of the present invention; z) the above mentioned wet quenching stage located in the process train downstream of the combustion and heat recovery sections as the first step in the combustion gas wet treatment section in an incineration process for chlorinated organic wastes can be used to concentrate the solution of the catalytically active metal salts required in the method according to the invention so as to minimise the quantity of metal-bearing liquid that has to be purged from the process.

Finally the present invention makes it possible to render the operation and control of the process of PCDD and PCDF micro-pollutant removal as simple and economical as possible with the minimum of additional elements compared to those that are in any case required for the operation of an incineration process for chlorinated organic wastes having a wet quenching and a wet absorption process for the removal of metals and hydrochloric acid from the combustion gases.

It can be anticipated that an incineration process for chlorinated organic wastes having about 60% organic chlorine content comprising a combustion chamber followed by a waste heat recovery boiler typically does not achieve better than several units of nanograms of toxic equivalent of poly-chlorinated dibenzodioxines and poly-chlorinated dibenzofurans per normal cubic metre of combustion gas compared with a European regulatory requirement of less than one tenth of a nanogram. By contrast, the application of the present invention has demonstrated the possibility of achieving less than one tenth of one nanogram without any further treatment for the removal of PCDD and PCDF micro-pollutants from the gas while at the same time maintaining acceptably low concentrations of the same micro-pollutants in the recovered hydrochloric acid and saline liquid purge streams from the process.

In a preferred embodiment of the method of the present invention the hot combustion gases coming from the combustion stage of a chlorinated organic waste incinerator, with or without a heat recovery section downstream of the combustion section itself, pass first through a stage of wet quenching in which the temperature of the gases is reduced from the temperature at which they leave the combustion section or the waste heat recovery section if present (steam boiler or heat exchanger) to their saturation temperature, using as recirculating liquid an aqueous solution of hydrochloric acid containing a suitable concentration of a salt or salts of a catalytically active metal or metals that are or may be present in the chlorinated organic wastes incinerated.

The quenched gases thereafter pass to a second stage in which metals are removed from the gas phase by absorption in a recirculating liquid phase of hydrochloric acid. When suitable catalytically active metals are present in the combustion gases, the acid containing the metals is used as the source of the acidic solution of a salt or salts of a catalytically active metal or metals that are required in the method of the present invention. In the absence of sufficient or suitable catalytically active metals in the combustion gases, a prepared solution of a salt of a suitable catalytically active metal is added to the recirculating acidic quench solution of the first stage. In the presence of sufficient and suitable catalytically active metals in the combustion gases, the concentration of the catalytically active metal salt in the recirculating quench solution in the first stage is regulated by means of the rate of purge of the solution.

After removal of the metals the combustion gases pass to a third stage comprising a hydrochloric acid absorber. A part of the metals-free hydrochloric acid produced is used as make-up for the absorption of the metals in the second stage in which the acidic solution of a salt or salts of a catalytically active metal or metals is formed, as required in the method of the present invention.

In the preferred embodiments of the apparatus of the present invention: f) the combustion gas quench stage may comprise a Venturi type quencher of adequate pressure drop such as to ensure an intimate contact between the hot combustion gases and the recirculating acid solution of the salt or salts of a catalytically active metal or metals; g) the absorption of metals from the combustion gases after they leave the quench section may be effected by a packed bed absorber having an external cooler for the recirculating solution for the purpose of the control of the process temperature; h) the absorption of hydrochloric acid gas from the combustion gases after they leave the metal absorption section may be effected by a packed bed absorber having an external cooler for the recirculating solution for the purpose of the control of the process temperature. After a portion of the recirculating metal-free acid solution has been used as make-up for the second stage of metals absorption, the net production of recovered metal-free acid is purged from the process at a rate depending on the concentration required. The inventory of recirculating metal-free acid is maintained by a make-up of fresh water.

Among the main advantages of the method of the present invention, it is particularly important to emphasise: A1) no additional equipment is required beyond that which is in any case required for the removal of metals and halogen acids from the combustion gases; A2) no additional operating costs are incurred compared to those which are in any case incurred for the removal of metals and halogen acids from the combustion gases; A3) the process conditions required are substantially the same as those that are in any case required for the stages of quenching and absorption of metals from the combustion gases; A4) a very much smaller quantity of purge material contaminated with PCDD/PCDF micro-pollutants has to be discharged from the process compared to methods which utilise activated carbon.

4) BRIEF DESCRIPTION OF THE DRAWINGS

The various features and advantages of the present invention will appear more clearly from the following description of the preferred embodiments as illustrated in the various figures of the drawings in which.

5) DETAILED DESCRIPTION OF THE PREFERRED EMBODIMENT

Figure 1:
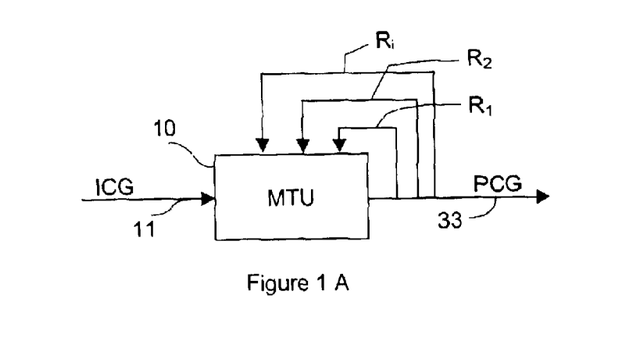
FIGS. 1A and 1B are overall block diagrams of the method for removing PCDD and PCDF micro-pollutants from combustion gases resulting from the incineration of chlorinated organic wastes.

FIG. 1A shows the main feature of the invention, i.e. the characteristic that the incineration combustion gases ICG (11) are treated in a multistage treatment unit MTU the outputs of which are:

the purified combustion gases PCG (33);

the reactants R1 . . . Ri obtained from the treatment of ICG and recycled back to MTU as pollutant removal agents. Accordingly said removal agents are extracted from ICG and fed back to MTU like an electronic feed-back (push-pull) amplifier.

Figure 1B:
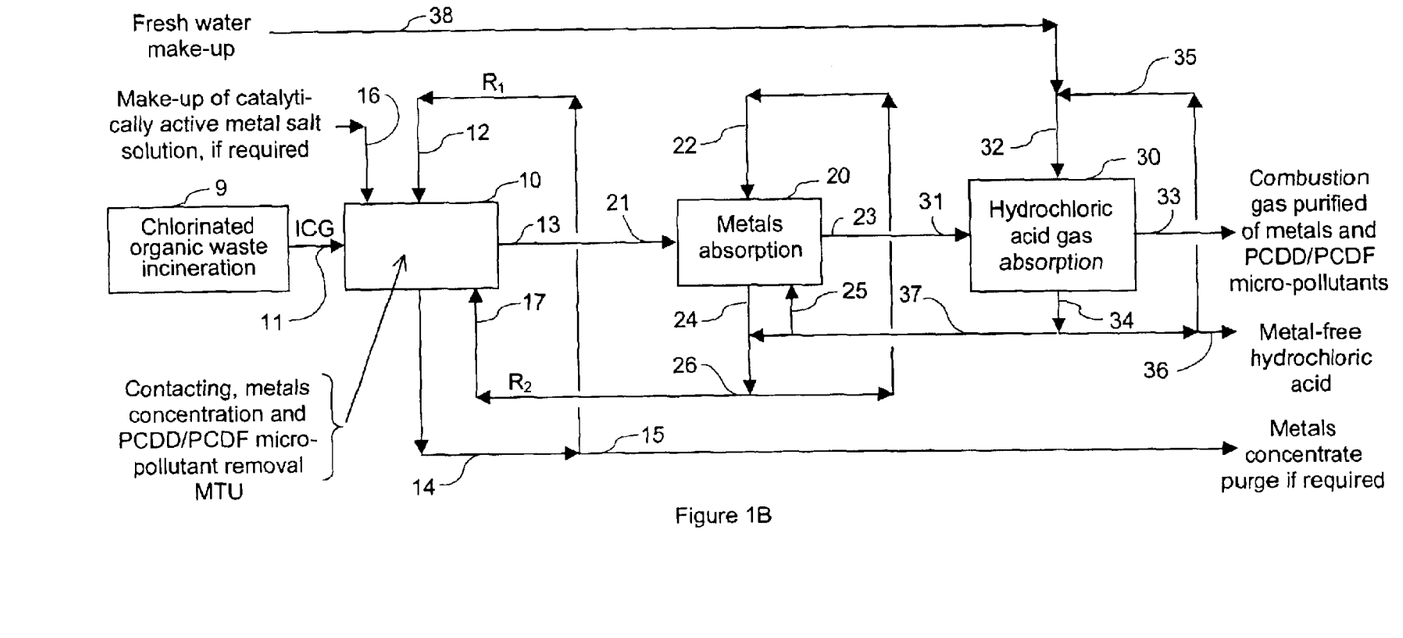

FIG. 1B is a block diagram illustrating a method especially adapted for application to an incineration process scheme which includes a wet scrubbing section for the removal from the raw combustion gases ICG of heavy metals and hydrochloric acid gas (HCl). The multistage treatment unit MTU comprises three stages, each stage receiving at least one recycled product from the output of itself or of a subsequent stage.

The hot, raw combustion gases coming from the combustion section of an incinerator for chlorinated organic wastes 9 enter the contacting, metals concentration and PCDD/PCDF micro-pollutant removal stage 10, through line 11. A recirculating acidic aqueous liquid stream containing hydrochloric acid at about 20% concentration and a high concentration of metal salts $R_1$ returns to stage 10 through 12. An acidic aqueous liquid stream containing hydrochloric acid and a low concentration of metal salts $R_2$ also enters stage 10 through 17. If necessary, a make-up liquid stream containing a catalytically active metal salt solution is added to stage 10 through 16. Preferably the contacting between ICG and the reactants $R_1$ . . . $R_i$ is effected in a quenching device.

In the MTU of FIG. 1B, three process steps now occur.

Firstly, the hot, raw combustion gases entering stage 10 through 11 are brought into intimate contact with the recirculating acidic aqueous liquid stream $R_1$ returning to stage 10 through 12. Part of the water and also part of the hydrochloric acid contained in the acidic aqueous liquid stream evaporates, thus saturating and cooling the combustion gases. As a result of this process step the cooled gas phase is enriched in both water vapour and hydrochloric acid gas.

Secondly, the intimate contact which occurs between the hot, raw combustion gases entering stage 10 through 11 and the recirculating acidic aqueous liquid stream returning to stage 10 through 12 causes the absorption of the PCDD/PCDF micro-pollutants, by reason of the affinity for them of the catalytically active metal or metals which are contained in the said recirculating acidic aqueous liquid stream, thereby removing the micro-pollutants from the gas phase and retaining them in the liquid phase.

Thirdly, the evaporation of part of the water and part of the hydrochloric acid contained in the total inventory of recirculating acidic aqueous liquid containing hydrochloric acid and metal salts in stage 10 results in the concentration of the metal salts which enter stage 10 through 17 since said metals salts suffer negligible evaporation.

The hot, raw combustion gases ICG may enter treatment unit MTU (10) through 11 either directly from the combustion or post-combustion chamber of the incinerator 9 at the prevailing combustion temperature or alternatively at some lower temperature after having passed through a heat recovery section such as a heat recovery boiler or a heat exchanger. The temperature at which the gases enter stage 10 through 11 governs the extent of the evaporation of water and hydrochloric acid in the same stage 10.

The acidic aqueous liquid phase containing hydrochloric acid and a high concentration of metal salts leaves stage 10 through 14. The major part of this liquid stream is recirculated to stage 10 through 12, whilst a small part leaves stage 10 through 15 as a purge of metals concentrate, if required. The cooled, saturated combustion gases enriched in water vapour and hydrochloric acid gas from which the PCDD/PCDF micro-pollutants have been removed leave the quenching, metals concentration and PCDD/PCDF micro-pollutant removal stage 10 through 13.

The metals absorption stage 20 accepts the cooled, saturated combustion gases enriched in water vapour and hydrochloric acid gas, from which the PCDD/PCDF micro-pollutants have been removed, at the inlet point 21. An acidic aqueous liquid phase containing hydrochloric acid and a low concentration of metal salts enters metals absorption stage 20 through 22. An acidic aqueous liquid phase containing a modest concentration of hydrochloric acid and a negligible concentration of metal salts enters metals absorption stage 20 as make-up through 25.

In the metals absorption stage 20 the cooled, saturated combustion gases enriched in water vapour and hydrochloric acid gas, from which the PCDD/PCDF micro-pollutants have been removed, are caused to enter into intimate contact with the acidic aqueous liquid phase containing hydrochloric acid and a low concentration of metal salts. The heavy metals which may be present in suspension in the gas phase as particulate matter, for example in the form of oxides, are absorbed by the acid to form the corresponding salts which dissolve in the liquid phase and are thus removed from the gas phase.

The acidic aqueous liquid phase containing hydrochloric acid and a low concentration of metal salts leaves stage 20 through 24. The major part of this liquid stream is recirculated to stage 20 through 22, whilst a small part leaves stage 20 through 26 as a purge of metals in order to compensate for the metals absorbed from the gas phase; this purge is sent to stage 10 for concentration as previously described. The combustion gases, still enriched in water vapour and hydrochloric acid gas but free from PCDD/PCDF micro-pollutants and metals leave the metals absorption stage 20 through 23.

The hydrochloric acid absorption stage 30 accepts the combustion gases, still enriched in water vapour and hydrochloric acid gas but free from PCDD/PCDF micro-pollutants and metals, at the inlet point 31. An acidic aqueous liquid phase containing a modest concentration of hydrochloric acid and free of metal salts enters hydrochloric acid absorption stage 30 through 32.

In the hydrochloric acid absorption stage 30 the combustion gases entering through 31, enriched in hydrochloric acid gas by the action of quenching, metals concentration and PCDD/PCDF micro-pollutant removal stage 10, are caused to enter into intimate contact with the acidic aqueous liquid phase containing a modest concentration of hydrochloric acid entering through 32. By this action the greater part of the hydrochloric acid gas present in the gas phase is transferred to the liquid phase.

The liquid phase, enriched in hydrochloric acid by the action of stage 30, leaves the said stage 30 by 34. A part of this stream is directed through 37 to stage 20, a further part leaves stage 30 through 36 as recovered metal-free hydrochloric acid, whilst the remainder is recirculated to stage 30 through 35. Before this recirculated stream returns to stage 30 a stream of fresh water is added as make-up through 38 to dilute the hydrochloric acid concentration. The diluted hydrochloric acid stream returns to hydrochloric acid absorption stage 30 through 32. The cooled, saturated combustion gas purified of metals and PCDD/PCDF micro-pollutants and having a substantially reduced concentration of hydrochloric acid gas, leaves hydrochloric acid absorption stage 30 through 33.

Figure 2:
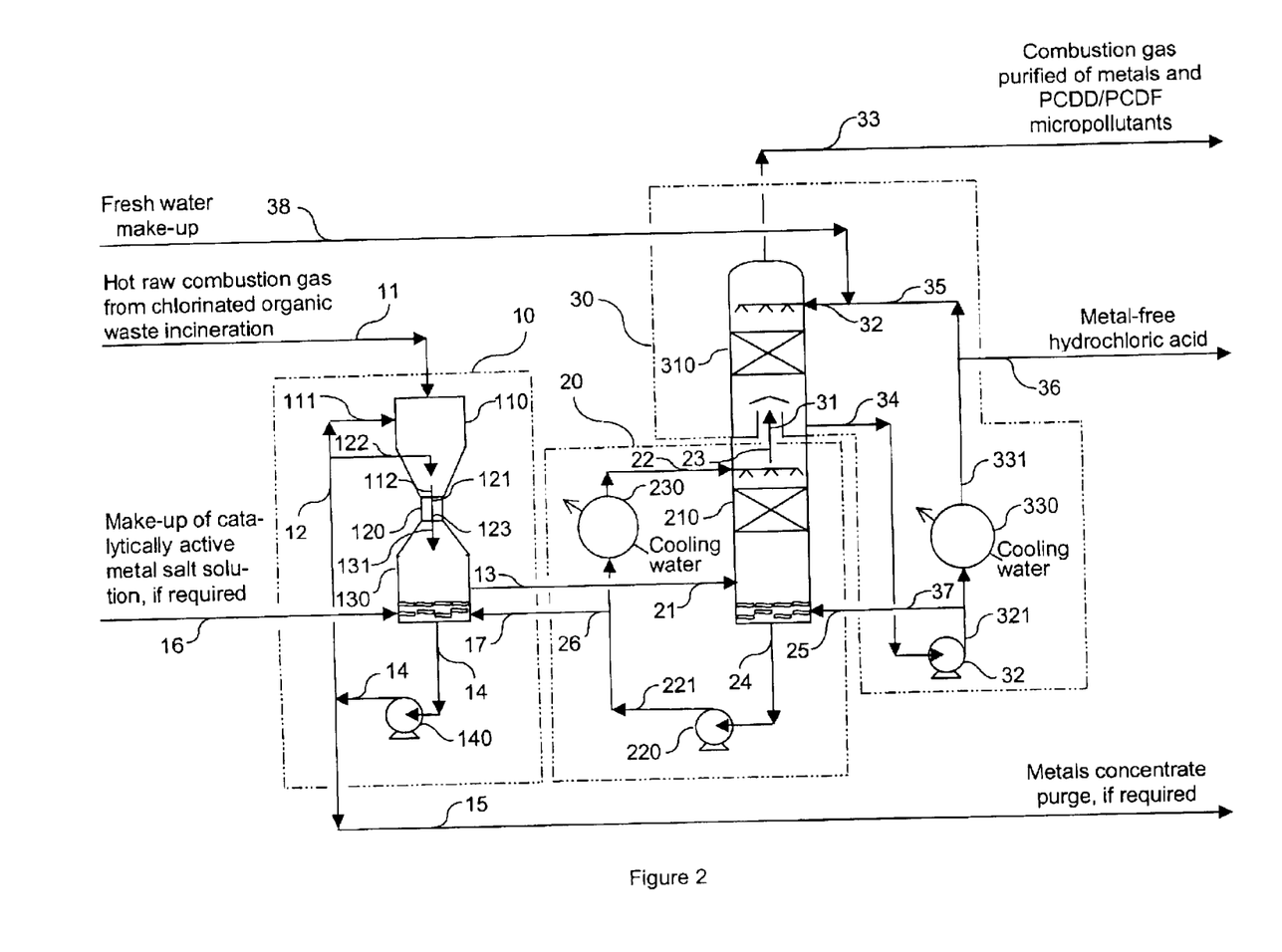
FIG. 2 is a diagram showing a detailed implementation of the method of FIG. 1

A method of removing the PCDD and PCDF micro-pollutants from the combustion gases resulting from the incineration of chlorinated organic wastes is assembled from these process stages as follows. With reference to FIG. 2 hot, raw combustion gas from the incineration of chlorinated organic wastes is fed to the quenching, metals concentration and PCDD/PCDF micro-pollutant removal stage 10 through 11. The stage 10 comprises three principle elements which are normally assembled as a single apparatus. The first principle element is a saturation volume 110 in which the hot raw combustion gases are caused to mix intimately with a stream of recirculating acidic aqueous liquid containing hydrochloric acid and a solution of a salt, preferably the chloride, of a suitable catalytically active metal or metals, preferably copper, introduced through 111 by means of spray nozzles in such a way as to form a fine mist of liquid. The intimate mixture of the fine liquid droplets and the hot raw gases causes part of the water and also part of the hydrogen chloride contained in the liquid to evaporate into the gas phase. This process cools and saturates the gas from the temperature at which it enters the stage 10, typically in the range of 800 to 220° C., to the equilibrium temperature determined by the compositions of the liquid and gas phases and the system pressure, typically in the range of 60 to 85° C. The evaporation of the water and hydrogen chloride has the effect of increasing their respective concentrations in the gas phase. The flowrate of the acidic aqueous liquid introduced through 111 is such that its ratio to that of the gas phase introduced through 11 ensures the presence of an excess of liquid phase after completion of the evaporation. The intimate mixture of gas and liquid phases, now substantially in thermal equilibrium, leaves the saturation volume 110 through 112.

The second principle element of stage 10 is an acceleration device 120 comprising a Venturi or similar restriction of the available flow area which accepts the intimate mixture of gas and liquid phases through 121. A further stream of the same recirculating acidic aqueous liquid containing hydrochloric acid and a solution of a salt, preferably the chloride, of a suitable catalytically active metal or metals, preferably copper, that is introduced into the quench volume 110 is also introduced into the acceleration volume 120 through 122. The acceleration of the gaseous and liquid phases as they pass together through the restricted flow area of acceleration device 120 causes a high degree of turbulence which favours the attainment of physical-chemical equilibrium between the phases. In this way the PCDD/PCDF micro-pollutants originally present in the gas phase either as molecules in the vapour state or adsorbed on the surface of dust particles suffer a mass transfer process in which they are displaced into the liquid phase by reason of the affinity for these chemical species exhibited by the catalytically active metal present in the same liquid phase as a dissolved salt. A portion of the metals contained in the combustion gases may also be absorbed by the acidic aqueous liquid. The magnitude of this effect depends upon their concentrations in the gas and liquid phases.

A variety of different designs of accelerating device are available commercially such as the simple Venturi, the multi-tube Venturi, the rod Venturi and the variable-section Venturi having an adjustable bob. In the process context in which the present method is employed the acceleration device also serves for the completion of the quenching of the gases. This is especially the case when their temperature of entry into the saturation volume 110 is in the upper part of its range. The choice of acceleration device accordingly depends not only on the requirement of the method of the present invention that the pressure drop should be at least 100 millimetres of water column, but also on the thermal requirements of the quenching process which may dictate a greater minimum pressure drop. The mixture of the gas phase from which the PCDD/PCDF micro-pollutants have been removed and the liquid phase into which they have been transferred leaves the acceleration device 120 through 123.

The third principle element of stage 10 is a disengaging volume 130 in which the gas/liquid mixture leaving the acceleration device 120 is accepted through 131 in the downwards vertical direction. The disengaging volume 130 comprises a zone of increasing flow area in which the velocity of the gas phase is reduced, surmounting a phase separation tank. The gas phase leaves the disengaging volume 130 through 13 in the horizontal direction. The combination of the change in direction of flow of the gas phase and the reduction in velocity promotes the inertial separation of the liquid droplets which fall to the bottom of the disengaging volume 130 and collect as a continuous liquid phase. The disengaging volume 130 serves also as a reservoir for the liquid. The liquid phase is withdrawn from the bottom of 130 through 14 and enters the liquid recirculation pump 140. The liquid leaves the pump through 141 and the major part is recirculated to stage 10 through 12. A purge stream 15 may be drawn off if required as described later. The liquid recirculated through 12 is sent in part to the quench volume 110 through 111 and in part to the acceleration device 120 through 122. If at times, for example because of variation of the type or origin of the chlorinated organic waste being incinerated, the raw combustion gases entering stage 10 through 11 do not contain a sufficient quantity, in the form of oxide dust or other, of a suitable catalytically active metal or metals, a make-up solution of a salt, preferably a chloride, of such metal or metals, preferably copper, is added through 16 to the liquid phase in the disengaging volume 130. If the combustion gases contain a significant quantity of metals these will accumulate in the liquid phase held in the reservoir of the disengaging volume 130 and it may be necessary to remove them from time to time in a purge stream 15.

The method of the present invention comprises the transfer of PCDD/PCDF micro-pollutants from the combustion gas into the recirculating liquid phase contained in stage 10. The PCDD/PCDF micro-pollutants, being associated with the catalytically active metal or metals dissolved in the liquid phase, are substantially involatile and therefore accumulate in said phase. The purge stream 15 will therefore be contaminated with PCDD/PCDF micro-pollutants. It is thus evidently advantageous that the total volume of the purge be kept as low as possible consistent with not exceeding the maximum recommended metals concentration in the liquid phase. By way of example and to illustrate the fact that it is the accumulation of metals rather than that of the PCDD/PCDF micro-pollutants which determines the purge rate, in the method of the present invention applied to an incinerator fed with liquid chlorinated organic waste containing about 0.5% weight of copper from catalyst residues, the rate of accumulation of copper in the liquid inventory of stage 10 is typically some one thousand times that of the rate of accumulation of PCDD/PCDF micro-pollutants in the same liquid.

The evaporation of water and hydrogen chloride from the recirculating liquid which occurs in the quenching volume 110 and which is completed in the accelerating device 120 causes a reduction in the total inventory of liquid. The inventory is maintained by means of a make-up of an acidic liquid stream coming from the metals absorption stage 20 and containing hydrochloric acid and a low concentration of metal salts which enters the bottom of disengaging volume 130 through 17.

The cooled and saturated combustion gases which leave stage 10 through 13 and from which the PCDD/PCDF micro-pollutants have been removed still contain the greater part of the metals which were present before their entry into stage 10 and they are also enriched in both water vapour and hydrogen chloride. This gas stream enters the metals absorber 210 of the metals absorption stage 20 through 21. The metals absorber consists preferably of a packed bed column, but may be alternatively a tray column, which can be conveniently constructed as a single body in common with the hydrochloric acid absorber of stage 30, as indicated in FIG. 2. This is convenient from the point of view of rational equipment layout but there is no essential obligation to do so for the implementation of the method of the present invention. Within the packed bed or the trays of the metals absorber 210 the combustion gases flow counter-current to a liquid stream of recirculating hydrochloric acid which enters the absorber 210 through 22. Metals, including the catalytically active metals, that are present in the entering gases in the form of oxide dusts or other are dissolved in the acidic liquid phase and are so removed from the gas phase. Part of the hydrochloric acid present in the gases and also part of the water which was added to them by the process of evaporation in the preceding stage 10 is absorbed in stage 20 to be returned to stage 10 with 26. In this way the concentration of the hydrochloric acid in the liquid circuit of stage 10 is maintained constant. The acidic aqueous liquid phase is collected in the base of the metals absorber 210 and leaves through 24 to enter the metals absorber liquid recirculation pump 220. From the pump 220 the major portion of the liquid enters the metals absorber liquid cooler 230. The minor portion of the liquid leaves stage 20 through 26 to supply the make-up to stage 10 through 17. This stream 26 serves to purge the absorbed metals from the metals absorption stage 20. The metals absorber cooler 230 has the function of removing the heat of absorption of the hydrochloric acid gas (HCl) absorbed, and the latent heat of condensation of the water vapour condensed, in the metals absorber 210. To this end the cooled acidic aqueous liquid leaves the absorber liquid cooler 230 at a temperature below that of the gas phase entering the metals absorber 210 through 21. The cooled acidic aqueous liquid returns to the top of the absorber through 22 and is distributed over the column internals (packed bed or trays) by means of a suitable distribution device such as an array of spray nozzles or a grid of weir channels. The material balance of the metals absorption stage 20 is maintained by a make-up stream of metal-free hydrochloric acid which enters through 25. The combustion gases, free of PCDD/PCDF micro-pollutants and metals but containing more water vapour and slightly more hydrochloric acid gas than what they contained at their entry to stage 10, leave the metals absorption stage 20 through 23.

The combustion gases which leave stage 20 through 23 enter the hydrochloric acid gas absorber 310 of hydrochloric acid gas absorption stage 30 through 31. The hydrochloric acid gas absorber 310 consists preferably of a packed bed column, but may be alternatively a tray column, which can be conveniently constructed as a single body in common with the metals absorber of stage 20, as indicated in FIG. 2. In the equipment arrangement illustrated in FIG. 2 in which the two columns 310 and 210 are mounted one above the other as a single body, the entry of the gas phase into 310 through 31 is by means of a chimney tray which has the function of permitting the flow of gas in the desired vertically upwards direction while avoiding any possibility of the liquid phase passing in the reverse direction from 310 to 210. Within the packed bed or the trays of the hydrochloric acid gas absorber 310 the combustion gases flow counter-current to a liquid stream of recirculating hydrochloric acid which enters the absorber 310 through 32. The hydrochloric acid gas (HCl) present in the combustion gases is absorbed in the hydrochloric acid liquid phase together with part of the water vapour and is so removed from the gas phase. The hydrochloric acid liquid phase, enriched by the hydrochloric acid gas removed from the combustion gases, is collected in the base of the hydrochloric acid gas absorber 310 and leaves through 34 to enter the hydrochloric acid gas absorber liquid recirculation pump 320. From the pump 320 the major portion of the liquid enters the hydrochloric acid gas absorber liquid cooler 330 through 321. The minor portion of the liquid leaves stage 30 through 37 to supply the make-up to stage 20 through 25. The hydrochloric acid gas absorber liquid cooler 330 has the function of removing the heat of absorption of the hydrochloric acid gas (HCl) absorbed, and the latent heat of condensation of the water vapour condensed, in the hydrochloric acid gas absorber 310. To this end the cooled acidic aqueous liquid leaves the absorber liquid cooler 330 through 331 at a temperature below that of the gas phase entering the hydrochloric acid gas absorber 310 through 31. The greater part of the cooled hydrochloric acid liquid phase in 331 returns to stage 30 through 35, entering the top of the absorber through 32 and is distributed over the column internals (packed bed or trays) by means of a suitable distribution device such as an array of spray nozzles or a grid of weir channels. The material balance of the absorption stage 30 is maintained both by a make-up stream of fresh water which enters stream 35 through 38, the combined stream then entering the top of the hydrochloric acid gas absorber 310 through 32, and also by a purge stream of recovered metals-free hydrochloric acid which leaves stage 30 through 36. The combustion gases, free now of PCDD/PCDF micro-pollutants, metals and substantially free of hydrochloric acid gas leave the hydrochloric acid gas absorption stage 30 through 33. Depending on the process requirements the gases may be further treated in a finishing stage for removal of other pollutants such as chlorine gas ($Cl_2$), nitrogen oxides ($NO_x$) and the remaining traces of hydrochloric acid gas. Such further treatment is beyond the scope of, and is not influenced by, the method of the present invention.

Figure 3:
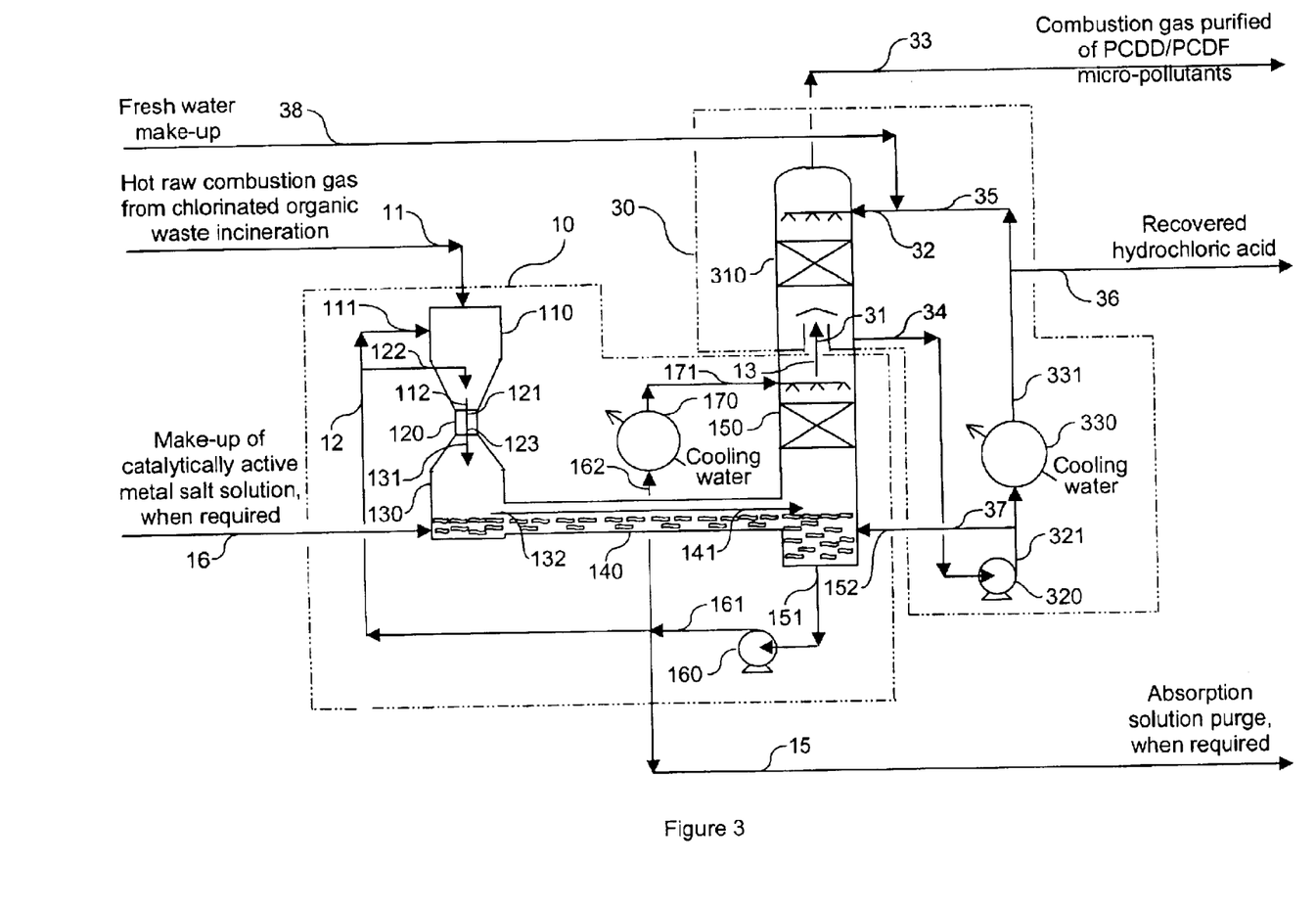
FIG. 3 is a diagram showing an alternative implementation of the method of FIG. 1 especially adapted for an incinerator of chlorinated organic wastes which do not contain significant amounts of catalytically active metals suitable for the method of the invention.

When the incineration process to which the method of the present invention is applied treats exclusively liquid or gaseous chlorinated organic wastes which are substantially free of metals, ash and suspended solids, the metals absorption stage 20 is not required and the quenching and PCDD/PCDF micro-pollutant removal stage 10 is therefore not required to effect concentration of metals. FIG. 3 illustrates such an alternative implementation of the method of the present invention.

With reference to FIG. 3 and FIG. 1B, the method comprises a quenching and PCDD/PCDF micro-pollutant removal stage 10 and a hydrochloric acid gas absorption stage 30. Hot, raw combustion gas from the incineration of chlorinated organic wastes is fed to the quenching and PCDD/PCDF micro-pollutant removal stage 10 through 11. The stage 10 comprises five principle elements which are normally assembled as a single apparatus. The first principle element is a saturation volume 110 in which the hot raw combustion gases are caused to mix intimately with a stream of recirculating absorption solution (an acidic aqueous liquid containing hydrochloric acid of about 20% concentration and a solution of a salt, preferably the chloride, of a suitable catalytically active metal or metals, preferably copper), introduced through 111 by means of spray nozzles in such a way as to form a fine mist of liquid. The intimate mixture of the fine liquid droplets and the hot raw gases causes part of the water and also part of the hydrogen chloride contained in the liquid to evaporate into the gas phase. This process cools and saturates the gas from the temperature at which it enters the stage 10, typically in the range of 800 to 220° C., to the equilibrium temperature determined by the compositions of the liquid and gas phases and the system pressure, typically in the range of 60 to 85° C. The evaporation of the water and hydrogen chloride has the effect of increasing their respective concentrations in the gas phase. The flowrate of the absorption solution introduced through 111 is such that its ratio to that of the gas phase introduced through 11 ensures the presence of an excess of liquid phase after completion of the evaporation. The intimate mixture of gas and liquid phases, now substantially in thermal equilibrium, leaves the saturation volume 110 through 112.

The second principle element of stage 10 is an acceleration device 120 comprising a Venturi or similar restriction of the available flow area which accepts the intimate mixture of gas and liquid phases through 121. A further stream of the same recirculating absorption solution that is introduced into the quench volume 110 is also introduced into the acceleration volume 120 through 122. The acceleration of the gaseous and liquid phases as they pass together through the restricted flow area of acceleration device 120 causes a high degree of turbulence which favours the attainment of physical-chemical equilibrium between the phases. In this way the PCDD/PCDF micro-pollutants originally present in the gas phase suffer a mass transfer process in which they are absorbed by the liquid phase by reason of the affinity for these chemical species exhibited by the catalytically active metal present in the same liquid phase as a dissolved salt.

As previously mentioned in the description of the implementation of the method of the present invention represented in FIG. 2, a variety of different designs of accelerating device are available commercially and the same considerations apply as before to the choice of device in the alternative implementation of FIG. 3. In the process context in which the present method is employed the acceleration device also serves for the completion of the quenching of the gases. This is especially the case when their temperature of entry into the saturation volume 110 is in the upper part of its range. The mixture of the gas phase from which the PCDD/PCDF micro-pollutants have been removed and the liquid phase into which they have been transferred leaves the acceleration device 120 through 123.

The third principle element of stage 10 is a disengaging volume 130 in which the gas/liquid mixture leaving the acceleration device 120 is accepted through 131 in the downwards vertical direction. The disengaging volume 130 comprises a zone of increasing flow area in which the velocity of the gas phase is reduced, surmounting a phase separation tank. The gas phase leaves the disengaging volume 130 in the horizontal direction through 132. The combination of the change in direction of flow of the gas phase and the reduction in velocity promotes the inertial separation of the liquid droplets which fall to the bottom of the disengaging volume 130 and collect as a continuous liquid phase.

The fourth principal element of stage 10 is a horizontal connecting duct 140 which unites the separation tank of disengaging volume 130 to the fifth principal element of stage 10 which is a sub-cooling column 150.

Both the cooled and saturated combustion gases, from which the PCDD/PCDF micro-pollutants have been removed, and the liquid phase leave the connecting duct 140 to enter the base the sub-cooling column 150, through 141. This liquid phase flows by gravity from the base of 130 into the base of 150 through the lower part of the connecting duct 140. The sub-cooling column 150 serves to condense the hydrochloric acid (that is to say the mixture of hydrochloric acid gas and water) which is evaporated from the liquid phase in the preceding stages 110 and 120. By this means the concentration and total inventory of the hydrochloric acid in the liquid phase is maintained. The base of the sub-cooling column 150 serves as a reservoir for the recirculating absorption solution (the acidic aqueous liquid containing hydrochloric acid and a solution of a salt, preferably the chloride, of a suitable catalytically active metal or metals, preferably copper). The absorption solution leaves the base of 150 through 151 and enters the suction of absorption solution recirculation pump 160. The solution is recirculated through 12 both to the quench volume 110 through 111 and to the acceleration device 120 through 122 and also through 162 to the sub-cooler 170 and thence through 171 to the sub-cooling column 150 itself. The sub-cooling column 150 consists preferably of a packed bed column, but may be alternatively a tray column, which can be conveniently constructed as a single body in common with the hydrochloric acid absorber of stage 30, as indicated in FIG. 3. In the equipment arrangement illustrated in FIG. 3, in a manner similar to that previously illustrated in FIG. 2, the two columns 310 and 150 are mounted one above the other as a single body, and the entry of the gas phase into 310 through 31 is by means of a chimney tray which has the function of permitting the flow of gas in the desired vertically upwards direction while avoiding any possibility of the liquid phase passing in the reverse direction from 310 to 150. As previously mentioned in the description of the implementation of the method of the present invention represented in FIG. 2, this is convenient from the point of view of rational equipment layout but there is no essential obligation to do so for the implementation of the method of the present invention. Within the packed bed or the trays of the sub-cooling column 150 the combustion gases flow counter-current to the stream of cooled absorption solution leaving the sub-cooler 170, which enters the sub-cooling column 150 through 171 at a temperature below that at which the gas phase enters the column. The gas phase is thus cooled below its dew point and part of the hydrochloric acid present in it, and also part of the water which was added to it by the process of evaporation in the preceding stages 110 and 120, is re-absorbed in stage 150 to be returned to the recirculating absorption solution. In this way the concentration of the hydrochloric acid in the absorption solution of stage 10 is maintained constant. The sub-cooler 170 has the function of removing the heat of absorption of the hydrochloric acid gas (HCl) absorbed, and the latent heat of condensation of the water vapour condensed, in the sub-cooling column 150. The cooled absorption solution leaving the sub-cooler 170, which is returned to the top of sub-cooling column 150 through 171, is distributed over the column internals (packed bed or trays) by means of a suitable distribution device such as an array of spray nozzles or a grid of weir channels. The combustion gases, free of PCDD/PCDF micro-pollutants and metals but containing more water vapour and slightly more hydrochloric acid gas than what they contained at their entry to stage 10, leave the sub-cooling column through 13.

Before commencement of operations, the absorption solution circuit is filled with an appropriate quantity of a make-up solution of a salt, preferably a chloride, of a catalytically active metal or metals, preferably copper, which is added through 16 to the liquid phase in the disengaging volume 130. The absorption of PCDD/PCDF micro-pollutants from the combustion gas phase involves the decrease of already extremely small concentrations of these substances. Therefore the rate of increase of their concentration in the recirculating absorption solution is extremely modest to the extent that no purge should normally be necessary between routine shut-downs for maintenance. Nevertheless, should the solution become contaminated by extraneous material, such for example as soot from abnormal combustion conditions in the upstream equipment, it may occasionally be necessary to purge part of the solution. This is effected by directing a part of the solution leaving the pump 160 to disposal through 15.

The evaporation of water and hydrogen chloride from the absorption solution which occurs in the quenching volume 110 and which is completed in the accelerating device 120 may not be completely compensated by the action of the sub-cooling column 150. The inventory is maintained by means of a make-up of an hydrochloric acid stream coming from the hydrochloric acid gas absorption stage 30 through 37 and which is received into the bottom of sub-cooling column 150 through 152.

The hydrochloric acid gas absorption stage 30 in the alternative implementation of the method of the present invention illustrated in FIG. 3 is identical to that of FIG. 2.

Figure 4:
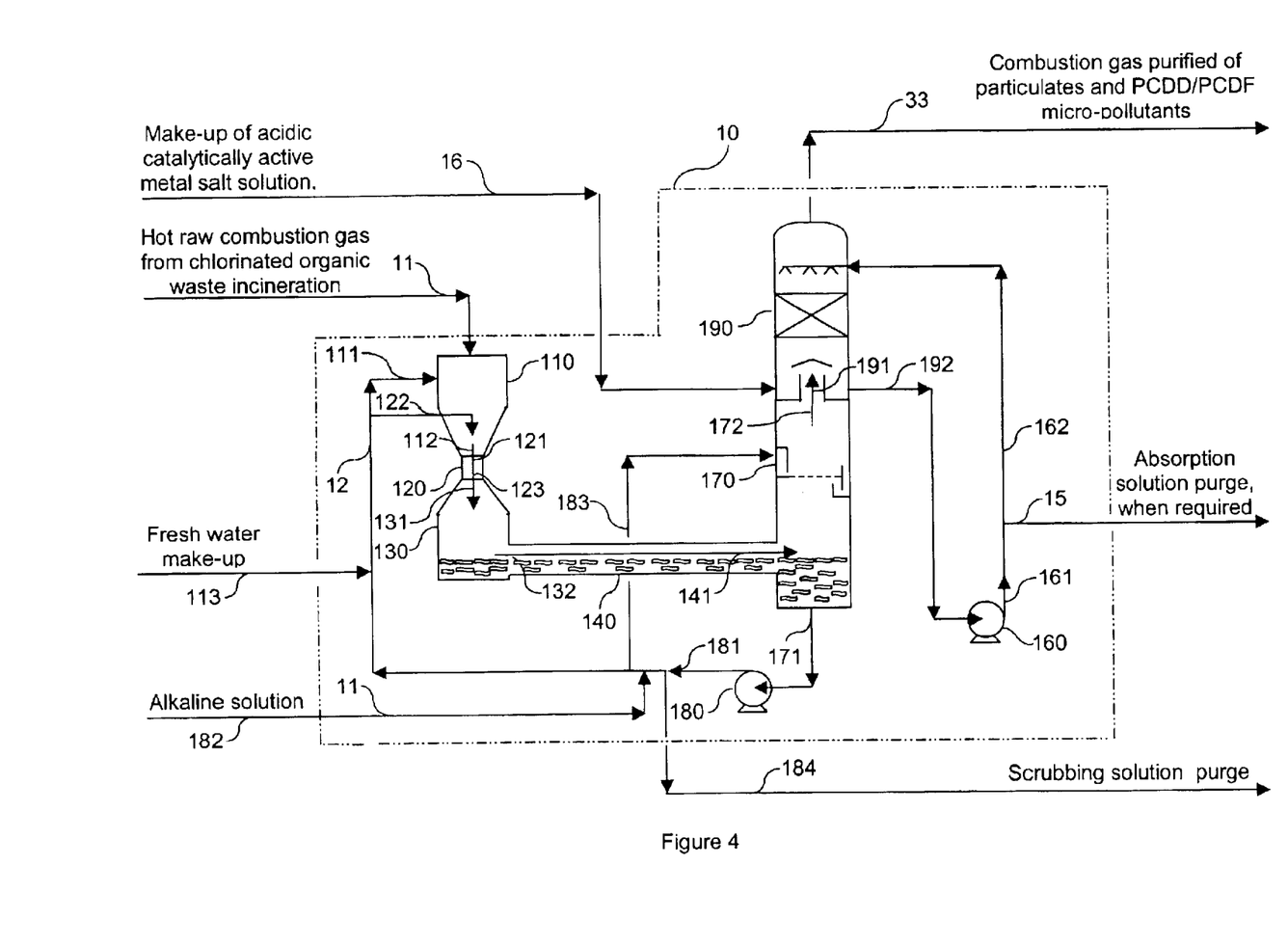
FIG. 4 is a diagram showing an alternative implementation of the method of FIG. 1 especially adapted for an incinerator of chlorinated organic wastes containing a high concentration of suspended solids, whose process scheme includes a wet scrubbing system without recovery of hydrochloric acid.

When the incineration process to which the method of the present invention is applied treats chlorinated organic wastes containing substantial amounts of solids, for example soil contaminated with liquid chlorinated organic waste or sludge containing chlorinated organic residues, the sequence of process steps can be varied for several reasons. In the first place it is not usually economic to recover hydrochloric acid because the chlorine content of the waste, and hence the concentration of hydrochloric acid gas in combustion gas will be variable, depending approximately inversely upon the solids content. In the second place it is unlikely that the waste will contain a significant amount of catalytically active metal suitable for the method of the present invention. In such cases the metals absorption stage 20 and the hydrochloric acid gas absorption stage 30 are not required and the quenching, metals concentration and PCDD/PCDF micro-pollutant removal stage 10 is not required to perform metals concentration. On the other hand stage 10 is required to perform the additional functions of particulates (entrained solids) removal and also the removal of the bulk of the hydrochloric acid gas present in the combustion gases. FIG. 4 illustrates such an alternative implementation of the method of the present invention.

With reference to FIG. 4 and FIG. 1B, the method comprises a stage 10 for quenching, removal of particulates and hydrochloric acid gas and PCDD/PCDF micro-pollutant absorption. The metals concentration stage 20 and the hydrochloric acid gas removal stage 30 are not required. Hot, raw combustion gas from the incineration of chlorinated organic wastes is fed to stage 10 through 11. The stage 10 comprises six principle elements which are normally assembled as a single apparatus. The first principle element is a saturation volume 110 in which the hot raw combustion gases are caused to mix intimately with a stream of recirculating scrubbing solution (an aqueous liquid containing a low concentration of free hydrochloric acid, salts and suspended solids) introduced through 111 by means of spray nozzles in such a way as to form a fine mist of liquid. The intimate mixture of the fine liquid droplets and the hot raw gases causes part of the water and also part of the hydrogen chloride contained in the liquid to evaporate into the gas phase. This process cools and saturates the gas from the temperature at which it enters the stage 10, typically in the range of 800 to 220° C., to the equilibrium temperature determined by the compositions of the liquid and gas phases and the system pressure, typically in the range of 60 to 85° C. The evaporation of the water has the effect of increasing its concentration in the gas phase. The flowrate of the scrubbing solution introduced through 111 is such that its ratio to that of the gas phase introduced through 11 ensures the presence of an excess of liquid phase after completion of the evaporation. The intimate mixture of gas and liquid phases, now substantially in thermal equilibrium, leaves the saturation volume 110 through 112.

The second principle element of stage 10 is an acceleration device 120 comprising a Venturi or similar restriction of the available flow area which accepts the intimate mixture of gas and liquid phases through 121. A further stream of the same recirculating scrubbing solution that is introduced into the quench volume 110 is also introduced into the acceleration volume 120 through 122. The acceleration of the gaseous and liquid phases as they pass together through the restricted flow area of acceleration device 120 causes a high degree of turbulence which favours the attainment of physical-chemical equilibrium between the phases. In this way the greater part of the hydrochloric acid gas originally present in the gas phase suffers a mass transfer process in which it is absorbed by the liquid phase. In addition, the bulk of the suspended solid particles are wetted by the liquid phase, becoming in effect droplets of liquid containing solids, which favours their coalescence.

As previously mentioned in the description of the implementation of the method of the present invention represented in FIGS. 2 and 3, a variety of different designs of accelerating device are available commercially and the same considerations apply as before to the choice of device in the alternative implementation of FIG. 4. In the process context in which the present method is employed the acceleration device also serves for the completion of the quenching of the gases. This is especially the case when their temperature of entry into the saturation volume 110 is in the upper part of its range. The mixture of the gas phase from which the bulk of the hydrochloric acid gas and of the suspended solids have been removed and the liquid phase into which they have been transferred leaves the acceleration device 120 through 123.

The third principle element of stage 10 is a disengaging volume 130 in which the gas/liquid mixture leaving the acceleration device 120 is accepted through 131 in the downwards vertical direction. The disengaging volume 130 comprises a zone of increasing flow area in which the velocity of the gas phase is reduced, surmounting a phase separation tank. The gas phase leaves the disengaging volume 130 in the horizontal direction through 132. The combination of the change in direction of flow of the gas phase and the reduction in velocity promotes the inertial separation of the liquid droplets and of the wetted suspended solids particles which fall to the bottom of the disengaging volume 130 and collect as a continuous liquid phase containing suspended solids.

The fourth principal element of stage 10 is a horizontal connecting duct 140 which unites the separation tank of disengaging volume 130 to the fifth principal element of stage 10 which is a scrubbing column 170.

Both the cooled and saturated combustion gases, from which the bulk of the hydrochloric acid gas and suspended solids have been removed, and the liquid phase, containing the hydrochloric acid and suspended solids removed from the gas, leave the connecting duct 140 to enter the base the scrubbing column 170, through 141. The liquid phase flows by gravity from the base of 130 into the base of 170 through the lower part of the connecting duct 140. The scrubbing column 170 serves to complete the removal from the gas phase of the suspended solids and most of the remaining hydrochloric acid gas.

The base of the scrubbing column 170 serves as a reservoir for the recirculating scrubbing solution. The scrubbing solution leaves the base of 170 through 171 and enters the suction of scrubbing solution recirculation pump 180. The liquid leaves the discharge of the pump 180 through 181. A minor part of the liquid is sent to disposal through 184 as a purge stream whose flowrate will depend on the concentrations of hydrochloric acid gas and suspended solids entering stage 10. The remainder of the solution is partially neutralised by the injection of an alkaline solution, preferably sodium hydroxide, through 182 and is thereafter recirculated both through 12 to the quench volume 110 (through 111) and to the acceleration device 120 (through 122) and also through 162 to the scrubbing column 170 itself. The amount of alkaline solution injected through 182 is regulated to keep the pH of the scrubbing solution only slightly acid so as to favour the absorption of hydrochloric acid gas. The scrubbing column 170 consists preferably of a tray column furnished with one or more valve type trays of the self-cleaning kind, which can be conveniently constructed as a single body in common with the PCDD/PCDF micro-pollutant absorption column 190, as indicated in FIG. 4. In a manner similar to that previously illustrated in FIGS. 2 and 3, in the equipment arrangement illustrated in FIG. 4, in which the two columns 190 and 170 are mounted one above the other as a single body, the entry of the gas phase into 190 through 191 is by means of a chimney tray which has the function of permitting the flow of gas in the desired vertically upwards direction while avoiding any possibility of the liquid phase passing in the reverse direction from 190 to 170. As previously mentioned in the description of the implementation of the method of the present invention represented in FIGS. 2 and 3, this is convenient from the point of view of rational equipment layout but there is no essential obligation to do so for the implementation of the method of the present invention. Within the trays of the scrubbing column 170 the combustion gases flow counter-current to the stream of scrubbing solution, which enters the column 170 through 183 at a temperature substantially equal to that at which the gas phase enters the column. The gas phase entering the scrubbing column 170 is already saturated and at its dew point and no further cooling is required. The scrubbing solution is distributed over the upper tray of the column by conventional means such as a downcomer and weir. The combustion gases, free of suspended solids and the bulk of the hydrochloric acid gas and metals but containing more water vapour than what they contained at their entry to stage 10, leave the scrubbing column through 172. To maintain the inventory of the scrubbing solution, which would otherwise be reduced both by the evaporation of water in stages 110 and 120 and by the withdrawal of the purge stream 15, a make-up of fresh water is added through 113 to the recirculating scrubbing solution in 12.

The sixth element of stage 10 is the PCDD/PCDF micro-pollutant absorption column 190 which receives the saturated, scrubbed combustion gases leaving the scrubbing column through 191. Within the PCDD/PCDF micro-pollutant absorber 190, which consists preferably of a packed bed column, but which may be alternatively a tray column, the combustion gases already free of suspended solids and the bulk of the hydrochloric acid gas and metals but containing more water vapour than what they contained at their entry to stage 10, flow counter-current to a stream of absorption solution. The absorption solution comprises a salt, preferably the chloride, of a suitably catalytically active metal or metals, preferably copper, dissolved in an acidic aqueous medium, preferably hydrochloric acid. Since the scope of the PCDD/PCDF micro-pollutant absorber 190 is only to absorb the PCDD/PCDF micro-pollutants, the hydrochloric acid concentration in the absorption solution is allowed to adjust itself automatically according to the physical-chemical equilibrium with the residual hydrochloric acid gas and water vapour concentrations in the gas phase. This results in a more dilute absorption solution than that which is used in the implementation of the method of the present invention illustrated in FIGS. 2 and 3. The absorption solution enters the upper part of the column 190 through 162 and is distributed over the column internals (packed bed or trays) by means of a suitable distribution device such as an array of spray nozzles or a grid of weir channels. The intimate contact between the gas and liquid phases promoted by the column internals causes the mass transfer of the PCDD/PCDF micro-pollutants from the gas phase into the liquid phase by reason of the affinity of these chemical species exhibited by the catalytically active metal or metals present in the same liquid phase as a dissolved salt. The liquid phase collects at the base of the column, being prevented from running back into the column 170 by the chimney tray, and is drawn off through 192 to enter the suction of the absorption solution recirculation pump 160.

The absorption solution leaves the pump 160 through 161 and all, or the major part thereof, is returned to the upper part of the column 190 through 162.

Before commencement of operations, the absorption solution circuit is filled with an appropriate quantity of a make-up solution of a salt, preferably a chloride, of a catalytically active metal or metals, preferably copper, which is added through 16 to the liquid phase in the base of the column 190. The absorption of PCDD/PCDF micro-pollutants from the combustion gas phase involves the decrease of already very small concentrations of these substances. Therefore the rate of increase of their concentration in the recirculating absorption solution is extremely modest to the extent that no purge should normally be necessary between routine plant shut-downs for maintenance. Nevertheless, should the solution become contaminated by extraneous material, such for example as salts of trace metals still present in the combustion gasses entering stage 190 through 191, it may exceptionally be necessary to purge part of the solution. This is effected by directing a part of the solution leaving the pump 160 through 161 to disposal through 15.

Depending on the process requirements the gases may be further treated in a finishing stage for removal of other pollutants such as chlorine gas ($Cl_2$), nitrogen oxides ($NO_x$) and the remaining traces of hydrochloric acid gas. Such further treatment is beyond the scope of and is not influenced by the method of the present invention.

The present invention has been described in terms of presently preferred but not limiting embodiments. Various alterations and modifications to the mode of application of the present invention to the process schemes for chlorinated organic waste incineration will become apparent to those skilled in the art. Therefore the following claims must be regarded as covering all the alterations and the modifications which fall within the spirit and the scope of this invention.

What is claimed is:

1. A method for the removal of micro-pollutants, in particular PCDD and PCDF, from combustion gases resulting from incineration of chlorinated organic wastes, said gases containing acidic products and traces of metals and being subjected to treatment with catalytically active reactants in a catalytic treatment unit, wherein said catalytically active reactants are obtained from said gases during treatment and are fed back to the catalytic treatment unit under conditions such that said reactants act as effective pollutant removal agents, said treatment comprising the steps of:
   a) quenching and saturating said combustion gases with a recirculating acidic liquid containing at least one catalytically active metal;
   b) absorbing PCDD/PCDF micro-pollutants from said combustion gases into said recirculating acidic liquid containing at least one catalytically active metal;
   c) concentrating said PCDD/PCDF micro-pollutants in said recirculating acidic liquid containing at least one catalytically active metal;
   d) obtaining said acidic liquid containing at least one catalytically active metal by absorbing said metal(s) from said combustion gases with the aid of an acid absorption medium; and
   e) recovering hydrochloric acid gas by absorption from the combustion gases and using a portion of such hydrochloric acid to produce the acid absorption medium, thereby forming a quenching and wet scrubbing sequence for removing not only macro-pollutants such as suspended solids, hydrochloric acid gas and metals, but also PCDD/PCDF micro-pollutants.

2. A method according to claim 1 wherein the concentration of said hydrochloric acid solution produced by absorption of hydrochloric acid gas from the combustion gases, and used in part for preparation of the acidic liquid containing catalytically active metal(s) is of 7 to 12%.

3. A method according to claim 2 wherein said metal is not present in significant concentration in the combustion gases and the metal in said recirculating acidic liquid is obtained by the addition of fresh metal salt(s) to a portion of the recovered hydrochloric acid.

4. A method according to claim 1 wherein the concentration of the hydrochloric acid in the recirculatung acidic liquid containing said catalytically active metal(s) used to absorb PCDD/PCDF micro-pollutants is of 15 to 25% concentration and preferably about 20%.

5. A method according to claim 4 wherein the metal content of the recirculating acidic liquid is allowed to rise by concentration to a maximum of 7 to 12% and preferably about 10%.

6. A method according to claim 4 wherein said metal is not present in significant concentration in the combustion gases and the metal in said recirculating acidic liquid is obtained by the addition of fresh metal salt(s) to a portion of the recovered hydrochloric acid.

7. A method according to claim 1 wherein the metal content of the recirculating acidic liquid is allowed to rise by concentration to a maximum of 7 to 12% and preferably about 10%.

8. A method according to claim 1 wherein said catalytically active metal is copper.

9. A method according to claim 1 for the removal of PCDD/PCDF micro-pollutants from combustion gases containing suspended solids comprising the steps of:
   a) quenching, saturation, suspended solids and hydrochloric acid gas removal by wet scrubbing;
   b) using hydrochloric acid as an acidic liquid containing said catalytically active metal(s) to absorb PCDD/PCDF micro-pollutants;
   (c) concentrating said PCDD/PCDF micro-pollutants in the same acidic liquid containing said metal(s).

10. A method according to claim 9 wherein said catalytically active metal is copper.

11. A method according to claim 10 wherein the concentration of hydrochloric acid in the recirculating acidic liquid containing copper is established by allowing the solution to come to physical-chemical equilibrium with the combustion gases.

* * * * *